C. E. HOOPS.
RESILIENT VEHICLE TIRE.
APPLICATION FILED NOV. 24, 1913.

1,124,439.

Patented Jan. 12, 1915.
2 SHEETS—SHEET 1.

WITNESSES:
R. Hamilton
L. J. Fischer

INVENTOR:
Charles E. Hoops,
BY
F. G. Fischer,
ATTORNEY.

C. E. HOOPS.
RESILIENT VEHICLE TIRE.
APPLICATION FILED NOV. 24, 1913.
1,124,439.
Patented Jan. 12, 1915.
2 SHEETS—SHEET 2.
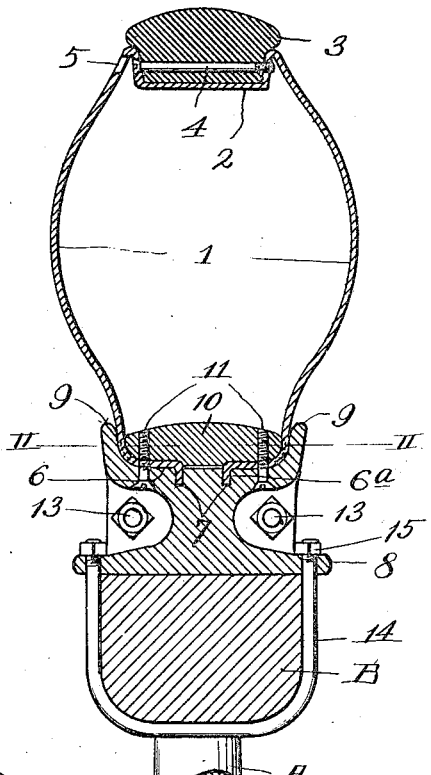
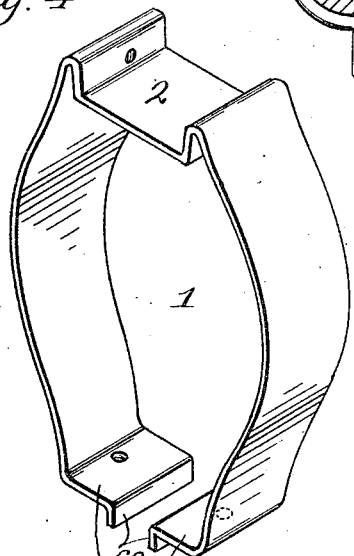
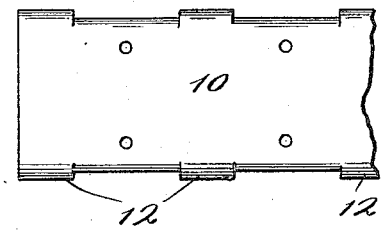
WITNESSES:
R. E. Hamilton
L. J. Fischer
INVENTOR:
Charles E. Hoops,
BY
F. G. Fischer,
ATTORNEY.

UNITED STATES PATENT OFFICE.

CHARLES E. HOOPS, OF KANSAS CITY, MISSOURI.

RESILIENT VEHICLE-TIRE.

1,124,439.

Specification of Letters Patent.

Patented Jan. 12, 1915.

Application filed November 24, 1913. Serial No. 802,616.

*To all whom it may concern:*

Be it known that I, CHARLES E. HOOPS, a citizen of the United States, residing at Kansas City, in the county of Jackson and State of Missouri, have invented certain new and useful Improvements in Resilient Vehicle-Tires, of which the following is a specification.

My invention relates to vehicle tires, and more particularly to tires of that description employed on automobiles.

The principal object of the invention is to dispense with the usual rubber pneumatic tire and use instead a novel form of tire having substantially the same resiliency as a pneumatic tire but devoid of its defects, such for instance, as the danger of being punctured, mutilated, or requiring frequent repairs.

A further object of the invention is to provide a tire which can be readily repaired upon the road should it become sufficiently damaged to require repairing.

Figure 1:
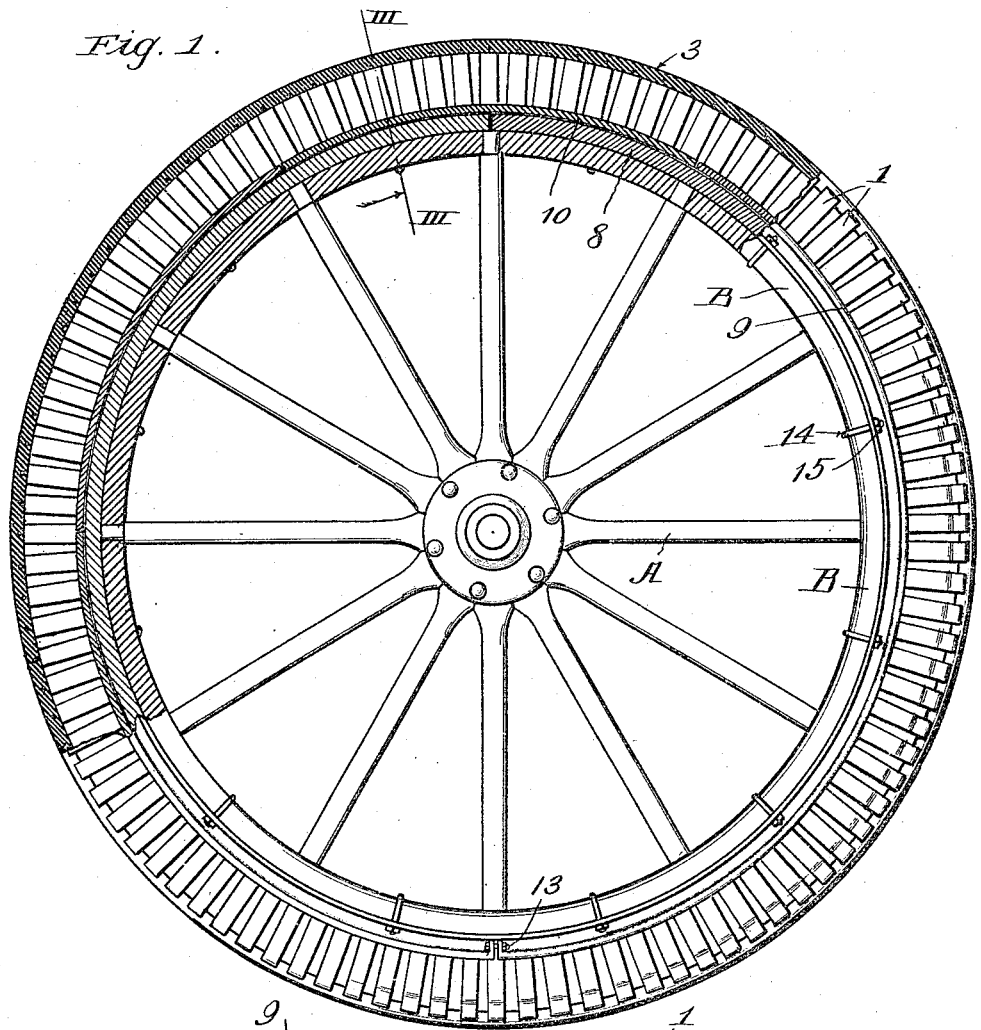
Figure 2:
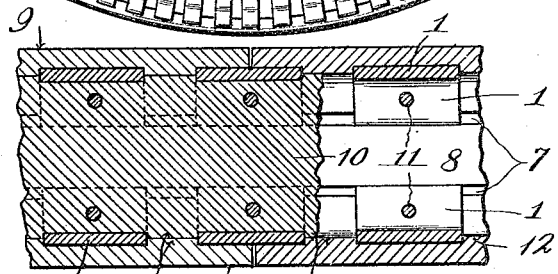

Other features of the invention will hereinafter appear, and in order that said invention may be fully understood, reference will now be made to the accompanying drawings, in which:

Figure 1 is a side elevation, partly in section, of my tire applied to a wheel. Fig. 2 is a broken section on line II—II of Fig. 3. Fig. 3 is a cross section, enlarged, on line III—III of Fig. 1. Fig. 4 is a detail perspective of a spring forming an important feature of the invention. Fig. 5 is a broken detail of a clamping segment employed in securing the springs to a rim.

A designates a wheel of any ordinary or preferred form, having a felly B.

1 designates a bow spring, an annular series of which are employed in constructing my tire. Each spring is provided at its outer portion with a U-shaped seat 2 to receive an annulus or tread portion 3 which may be of rubber, leather, metal, or any other suitable material adapted for traversing the surface of a road. The annulus 3 is firmly secured to each spring 1 by transverse screws 4, which extend through the seats 2 and the annulus 3 as disclosed by Fig. 3, each screw being inserted in place through an opening 5 in one side of each bow spring.

The inner ends of the bow springs 1 are bent toward each other as indicated at 6 and then terminate in parallel portions $6^a$, that fit into a pair of peripheral grooves 7 in the rim 8, which has marginal flanges 9 that extend upward a suitable distance on opposite sides of the springs 1 to assist the terminals $6^a$ to support the springs from undue lateral movement. The outer portions of the bow springs 1 are held equal distances apart by the annulus 3 and the screws 4, while the inner ends of the springs are held equal distances apart and prevented from creeping toward or away from each other by a series of clamping segments 10, which lie upon the inturned portions 6 of the springs and secure the same upon the rim 8. The clamping segments 10 are reliably secured upon the rim 8 by screws 11 which pass through the upper portions of said rim and the inturned portions 6 of the springs, and are screwed into the clamping segments 10. In order to better hold the inner ends of the springs 1, from creeping toward or away from each other, the rim 8 and the clamping segments 10 are provided with abutting lugs 12 which extend into the spaces between the springs, as shown on Fig. 2.

Rim 8 is, preferably, made in two sections connected by bolts 13, so that it can be readily applied to or removed from the felly B. Should one or more of the springs break, they can be taken out and replaced with new springs by removing the screws 4 and the proper clamping segment 10, without disturbing the other clamping segments and the springs they hold. In practice, the annulus or tread portion 3 receives all the wear to which the tire is subjected, and the springs 1 operate to take up all jolts and vibration produced by travel of the tire over rough or uneven surfaces. The rim 8 is removably-secured to the felly B in any suitable manner, U-bolts 14 and nuts 15 being shown for that purpose.

Having thus described my invention, what I claim and desire to secure by Letters Patent is:

In combination, an annular series of bow springs spaced equidistant apart and having their ends bent toward each other and terminating in parallel portions, a rim having two upturned marginal flanges bearing against the sides of the springs and two peripheral grooves to receive the ends of said springs, a clamping-member holding the springs against the periphery of the rim and the marginal flanges, two rows of screws extending through the rim and the springs and the clamping member to firmly bind the whole together, and lugs on the rim and the clamping-member, projecting into the spaces between the springs, for the purpose set forth and described.

In testimony whereof I affix my signature, in the presence of two witnesses.

CHARLES E. HOOPS.

Witnesses:
R. E. HAMILTON,
L. J. FISCHER.

Copies of this patent may be obtained for five cents each, by addressing the "Commissioner of Patents, Washington, D. C."